Feb. 10, 1970  F. W. FORK ET AL  3,494,651
SPRING CLIPS FOR UNDERFLOOR TRENCH COVERS
Filed June 6, 1967  2 Sheets-Sheet 1
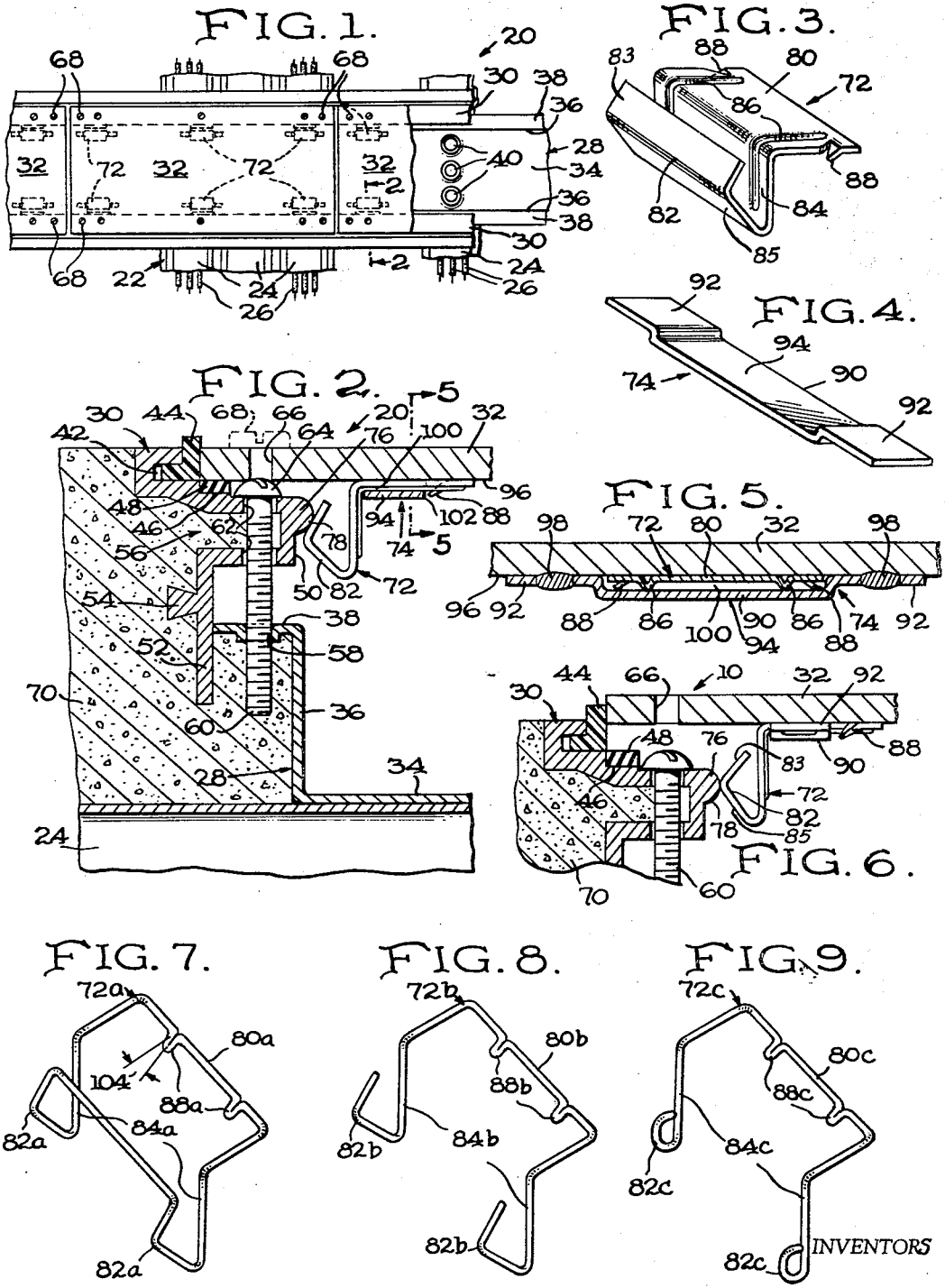
INVENTORS
WILLIAM H. FUELLENWARTH
FRANK W. FORK
BY
George E. Manias AGENT

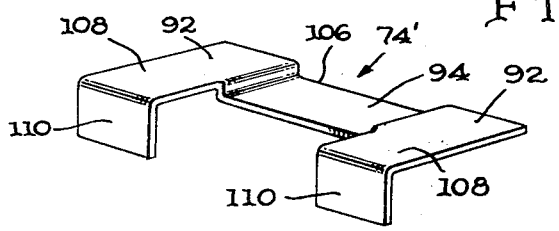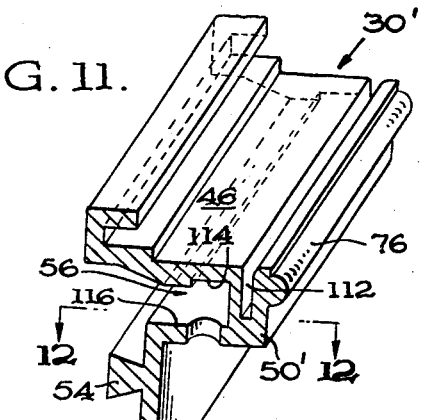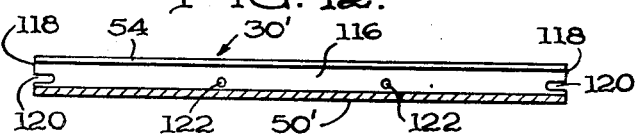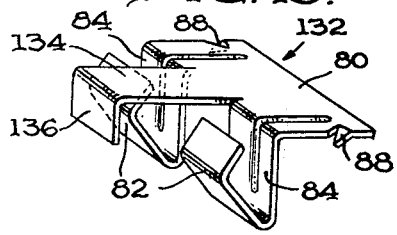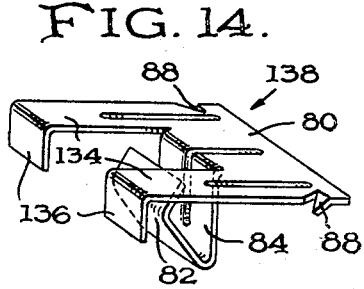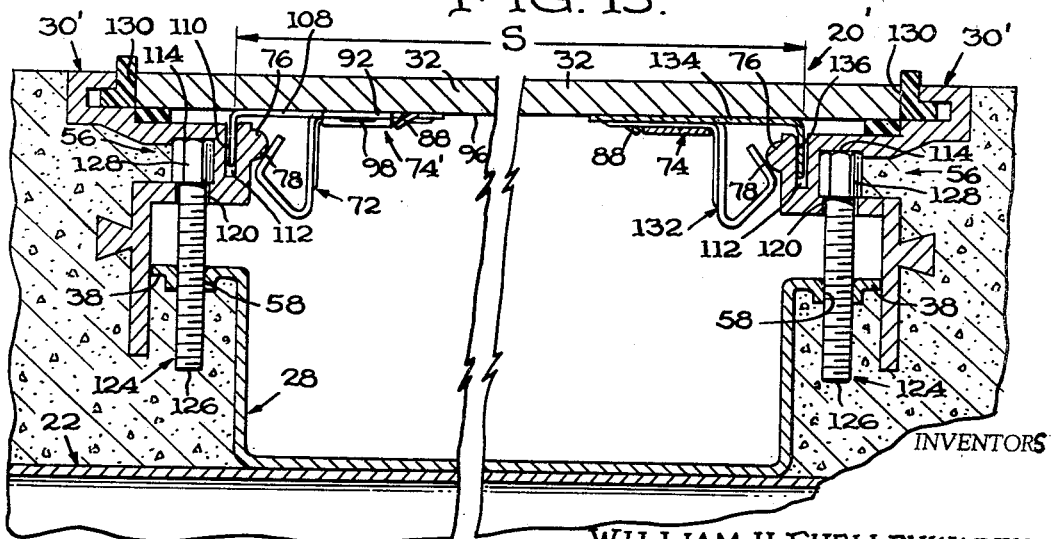

United States Patent Office 3,494,651
Patented Feb. 10, 1970

3,494,651
SPRING CLIPS FOR UNDERFLOOR TRENCH COVERS
Frank W. Fork, Allison Park, and William H. Fuellenwarth, Bradford Woods, Pa., assignors to H. H. Robertson Company, Pittsburgh, Pa., a corporation of Pennsylvania
Filed June 6, 1967, Ser. No. 644,014
Int. Cl. B65d 45/16; E04f 19/08; E04b 5/48
U.S. Cl. 292—256                                          11 Claims

ABSTRACT OF THE DISCLOSURE

An underfloor electrical cable trench assembly having a base pan; spaced-apart, vertically adjustable side rails; and a cover plate spanning the distance between and supported by the side rails. The cover plate is provided with spring clips which resiliently engage the side rails and detachably connect the cover plate to the side rails. The spring clips are detachably connected to the cover plate in a manner which prevents embrittlement of the spring clips. A tongue-and-groove connection is provided between the cover plate and each of the side rails to maintain the side rails in a predetermined spaced-apart relation.

BACKGROUND OF THE INVENTION

Field of the invention

This invention relates to an underfloor electrical trench assembly employing spring clips for detachably connecting a cover plate to the side rails of the trench assembly, and more particularly to improved means for connecting the spring clips to the cover plates.

Description of the prior art

Underfloor electrical trenches first appeared as commercial products in about 1961. Typical trench products are described in U.S. Patents 3,074,208; 3,084,480; 3,101,097; 3,166,633; 3,204,378; 3,237,356; 3,262,238. All of these products include a base pan, vertically adjustable side rails, and a cover plate positioned above the base pan and spanning the distance between the side rails. All prior electrical trenches have included hold-down screws extending through the cover plate into the subjacent elements and having heads exposed above the level of the cover plate where the heads are visible and operable at the floor level.

Elimination of the exposed fasteners has been accomplished by providing the cover plate with resilient connecting means serving to detachably connect the cover plate to the side rails. Examples of such connecting means will be found in copending applications Ser. Nos. 540,686 and 602,791, both assigned to the assignee of the present invention.

In the past, the spring clips have included mounting flanges engaging the undersurface of the cover plate. The mounting flanges were secured directly to the cover plates by means of spot welding. This method of securing the spring clips to the cover plates has two disadvantages. First the spring clips become embrittled when welded and tend to break away from the cover plate at the weld point. Second, the spring clip is permanently secured to the cover plate and cannot be conveniently replaced in the event it is damaged.

The hold-down fasteners of prior art trench assemblies, serve two distinct functions. Their primary function is to secure the cover plate to the side rails. A secondary but important function is to tie the side rails to the cover plate thereby maintaining the side rails in a substantially parallel, spaced-apart relation prior to embedment of the trench assembly in a concrete floor construction. Elimination of the hold-down screws has resulted in a loss of means for maintaining the side rails in the aforesaid substantially parallel, spaced-apart relation.

SUMMARY OF THE INVENTION

The principal object of this invention is to provide an improved underfloor trench having cover plates which are free of exposed fasteners.

Another object of this invention is to provide novel means for detachably connecting the spring clips to the cover plates, whereby damaged spring clips may be readily replaced.

A further object of this invention is to connect the spring clips to the cover plate in a manner which avoids embrittlement.

Still another object of this invention is to provide means for maintaining the side rails in a substantially parallel, spaced-apart relation prior to embedding the trench assembly in a concrete floor construction.

In the present trench asembly, two or more spring clips are provided along each longitudinal edge of the cover plate. The spring clips have first ends engaging the cover plate and second ends depending therefrom into resilient engagement with opposed surfaces presented by the trench side rails. The spring clips detachably connect the cover plate to the side rails.

In accordance with the present invention, retaining means is provided for securing each spring clip to the cover plate. The present retaining means overlaps edges of the spring clips and has portions thereof secured directly to the undersurface of the cover plate. The present retaining means detachably connects each spring clip to the cover plate whereby a damaged spring clip may be readily replaced. Catch means is provided which prevents inadvertent disengagement of the spring clips from the cover plates.

Further in accordance with the present invention, tongue-and-groove means is provided for connecting each of the side rails to the cover plate. The arrangement is such that the side rails are maintained in substantially parallel, spaced-apart relation prior to embedment of the trench assembly in a concrete floor construction.

BRIEF DESCRIPTION OF THE DRAWINGS

The above and other objects and advantages of the present invention will become apparent from the following detailed description by reference to the accompanying drawings, in which:

FIGURE 1 is a plan view of an electrical trench assembly installed above metal cellular flooring in a typical building floor construction;

FIGURE 2 is a cross-sectional view taken along the line 2—2 FIGURE 1;

FIGURE 3 is an isometric view of a spring clip;

FIGURE 4 is an isometric view of a strap employed to detachably connect a spring clip to a cover plate;

FIGURE 5 is a cross-sectional view taken along the line 5—5 FIGURE 2;

FIGURE 6 is fragmentary cross-sectional view, similar to FIGURE 2, illustrating the deflection of a spring clip during installation or removal of a cover plate;

FIGURES 7, 8 and 9 are isometric views illustrating alternative embodiments of a spring clip;

FIGURE 10 is an isometric view of an alternative embodiment of a strap;

FIGURE 11 is a fragmentary isometric view of an alternative embodiment of a side rail;

FIGURE 12 is a cross-sectional view, taken along the line 12—12 of FIGURE 11;

FIGURES 13 and 14 are isometric views of further alternative embodiments of a spring clip;

FIGURE 15 is a cross-sectional view taken transversely through a modified trench assembly.

DESCRIPTION OF THE PREFERRED EMBODIMENTS

The present electrical trench assembly 20 is illustrated in FIGURE 1 as mounted above metal cellular flooring 22 in a typical modern building. The metal cellular flooring 22 has a plurality of parallel cells 24 constituting electrical raceways for electrical conductors 26 which are distributed throughout the resulting building. A typical electrical trench 20 includes a base pan 28, side rails 30 and cover plates 32. The base pan 28 includes an essentially flat base 34, vertical sidewalls 36 and outwardly extending horizontal flanges 38. Grommeted openings 40 extend through the base 34 into the subjacent, transverse raceway 24 to provide ingress for electrical conductors 26 from the raceway 24 into the electrical trench 20. Where the resulting building has a reinforced concrete construction instead of a metal cellular flooring construction, the base pan 28 may be resting upon and secured to metal cellular raceways in lieu of metal cellular flooring raceways 24.

The side rails 30 are generally similar to those illustrated and described in U.S. Patent 3,262,238. Referring to FIGURE 2, the side rail 30 includes a channel 42 for receiving a reversible tile stop 44; a shoulder 46 for receiving a strip gasket 48; a rail 50; a depending skirt 52; and preferably one or more concrete anchor appendages 54. While the rail 50 may be solid, it is preferred that the rail 50 include an outwardly opening channel 56. The side rails 30 preferably are formed from aluminum alloy by extrusion processes to the desired profile.

The outwardly extending horizontal flanges 38 of the base pan 28 are provided with spaced threaded apertures 58 for threadedly receiving elevating screws 60 which extend through clearance openings 62 in the rail 50 and which have an enlarged head 64. When the trench assembly is fabricated, the cover plate 32 includes a number of spaced clearance access openings 66 which are smaller in diameter than the head 64 of the elevating screws 60. Accordingly a screw-turning implement, such as a screw driver tip, can be inserted through the access opening 66 to operate, i.e., to turn, the elevating screws 60 and thereby adjust the height of the screw head 64 above the horizontal flange 38 of the base pan 28.

As shown in FIGURE 2, the cover plate 32 rests upon the screw head 64. In order to maintain the cover plate 32 in association with the side rails 30, a number of temporary hold-down screws 68 are provided which extend through the cover plate 32 and are threadedly engaged in the rail 50. During fabrication, shipment storage and installation of the present trench 20, the side rails 30 and the cover plate 32 are maintained as a unitary subassembly by positive fasteners which rigidly connect them, such as the screw 68. After the trench assembly 20 has been embedded in concrete 70, as shown in FIGURE 2, the hold-down screws 68 are removed and discarded. A hold-down screw 68 is shown in dotted outline in FIGURE 2 to indicate its temporary use.

After the screws 68 have been removed, the cover plate 32 is detachably connected to the side rails 30 by spring clips 72 (FIGURES 1 and 2) which, in turn, are connected to the cover plates 32 by retaining means 74 (FIGURE 2) of the present invention. The spring clip 72 is engageable with an inwardly disposed element of the side rail 30 such as an inwardly presented bead 76 which is extruded directly as an integral element of the side rail 30. It will be understood that the bead 76 of both side rails 30 present opposed surfaces 78, as illustrated in FIGURE 14 for example, which are resiliently engaged by the clips 72.

The preferred arrangement of the spring clip 72 is shown in FIGURE 3. The spring clip 72 includes a first end 80 and a second end 82 connected to the first end 80 by an intermediate segment 84. The second end 82 has diverging camming surfaces 83, 85 which, as shown in FIGURE 6, are positioned between the side rails 30 for camming engagement with the opposed surface 78. Ribs 86 are formed in the first end 80 and the intermediate segment 84 to strengthen the spring clip 72 and to act as spacers, as will be described. Catch means, such as tangs 88, are provided at the opposite edges of the first end 80. As will be described, the tangs 88 prevent inadvertent disengagement of the spring clips 72 from the cover plate 32.

Referring now to FIGURE 4, the present retaining means 74 preferably comprises a strap 90 having end portions 92 and a convex indentation defined by a displaced central portion 94. The strap 90 is preferably formed from carbon steel and is coated as is the cover plate 32 with a suitable corrosion resistant coating after it has been secured to the cover plate 32.

Referring now to FIGURES 2 and 5, the strap portions 92 engage the undersurface 96 of the cover plate 32 and are secured directly thereto by spot welds 98. The displaced central portion 94 cooperates with the undersurface 96 to define a passageway 100.

To install a spring clip 72, the first end 80 thereof is inserted into the passageway 100. The ribs 86 engage the displaced central portion 94 while the first end 80 engages the undersurface 96 of the cover plate. The first end 80 is thereby captively retained within the passageway 100. The tangs 88 are displaced during the passage of the first end 80 through the passageway 100. When the clip 72 has been installed, the tangs 88 are positioned to engage an edge 102 of the displaced central portion 94. The tangs 88 serve to prevent inadvertent withdrawal of the first end 80 from the passageway 100. It should also be noted that the spring clip 72 may be removed simply by depressing the tangs 88 and withdrawing the first end 80 from the passageway 100.

Alternatively, the spring clip may, instead, be formed from spring steel wire. As shown in FIGURE 7 the spring clip 72a includes a first end 80a and second end 82a and an intermediate segment 84a. Tangs 88a are provided which are inclined relative to the first end 80a at an angle indicated at 104. As shown in FIGURE 8, a spring clip 72b includes a first end 80b, second ends 82b and intermediate segments 84b. The first end 80b is provided with tangs 88b. As shown in FIGURE 9, the spring clip 72c includes a first end 80c provided with tangs 88c, second ends 82c and intermediate segments 84c. Installation and removal of the spring clips 72a, 72b and 72c is accomplished in the manner explained above.

Further alternative embodiments of the present trench assembly will now be described with reference to FIGURES 10 to 15. Corresponding numerals will be employed to identify corresponding parts heretofore described.

Referring to FIGURE 10 there is illustrated retaining means 74′ comprising a strap 106 having strap portions 92 and a displaced central portion 94. Each of the strap portions 92 is provided with an extension 108 terminating in a down-turned flange 110. As will hereinafter be more fully described, the flanges 110 serve to maintain the side rails in substantially parallel, spaced-apart relation.

Referring to FIGURE 11, there is illustrated a side rail 30′ wherein the shoulder 46 of a rail 50′ is provided with a longitudinally extending, vertical groove 112. In addition, a longitudinally extending recess 114 is provided below the level of the shoulder 46 and within the channel 56. A web 116 connected to the skirt 52 cooperates with the shoulder 46 to define the channel 56. As will be described, the heads of leveling screws will reside in the recess 114 and be captively retained between the shoulder 46 and the web 116.

A sectional plan of view of the side rail 30′ showing the ends 118 thereof is illustrated in FIGURE 12. The web 116 has slots 120 formed at the ends 118 and clearance openings 122 intermediate the ends 118. The slots 120 have a width which is less than the diameter of the expanded head of a leveling screw and is slightly greater than the threaded shank of a leveling screw. The clearance openings 122, however, have a diameter which is slightly greater than the diameter of the expanded head of a leveling screw.

In assembling the side rail 30' to the base pan 28, as shown in FIGURE 15, leveling screws 124 are employed which include a threaded shank 126 and an enlarged head 128. The enlarged head 128 has a polygonal configuration, preferably hexagonal. During installation, two leveling screws 124 are threaded into two adjacent ones of the threaded apertures 58 provided in the horizontal flange 38. The enlarged heads 128 of two additional leveling screws 124 are each slid into the channel 56 such that the threaded shanks 126 thereof are received in the slots 120, as shown in FIGURE 15. Thereafter, the leveling screws residing in the slots 120 are rotated by means of an implement inserted through the channel 56 into engagement with the enlarged head 128. The side rail 30' is lowered in this manner, until the enlarged heads 128 of the intermediate leveling screws 124 pass through the clearance openings 122 and engage the recess 114. When the side rails 30' are to be leveled, as required when the trench assembly 120' is installed on the metal cellular flooring 22, for example, the leveling screws residing in the slots 120 are first rotated to level the side rails 30'. Thereafter, the intermediate leveling screws, that is the leveling screws passing the clearance openings 122 are rotated such that the enlarged heads 128 thereof are elevated into engagement with the recess 114. At that time, each of the side rails 30' is supported by a plurality of leveling screws 124.

Returning now to FIGURES 10 and 15, the retaining means 74' is applied to the undersurface 96 of the cover plate 32 and secured directly thereto by spot welds 98 passing through the strap portions 92. The retaining means 74' is positioned on the undersurface 96 at a predetermined distance from the cover plate edge 130. The cover plate edge 130 is normally at a predetermined location relative to the side rail 30', the overall arrangement being such that the depending flange 110 will be received in the vertical groove 112 to provide a tongue-and-groove connection between the cover plate 32 and both of the side rails 30'. It is to be understood that two or more of the flanges 110 will be positioned adjacent to each of the opposite edges 130 of the cover plate 32. Thus, the overall arrangement is such that the tongue-and-groove connections provided between the cover plate 32 and each of the side rails 30' operates to maintain the side rails 30' at a predetermined spacing, such as indicated by the dimension line labeled S. In addition, the side rails 30' are maintained substantially parallel to one another.

As will be appreciated, use of the above-described tongue-and-groove connection has eliminated the need and the expense associated with forming the access openings 66 in the cover plate 32.

As shown in FIGURE 10 and in the left hand side of FIGURE 15, the flanges 110 are carried by the retaining means 74'. Alternatively, the flanges may be carried by the spring clips. In this connection, reference is directed to FIGURES 12 and 14 which illustrate alternative embodiments of the spring clip. Corresponding numerals will be employed to identify corresponding parts heretofore described.

Referring to FIGURE 13, a spring clip 132 is illustrated as having a first end 80 and second ends 82 connected to the first end 80 by intermediate segments 84. Tangs 88 are provided along the edges of the first end 80. In this embodiment, the first end 80 is provided with an extension 134 which terminates in a down-turned flange 136.

Referring to FIGURE 14, there is illustrated a spring clip 138 having a first end 80 and a second end 82 connected to the first end 80 by an intermediate segment 84. Tangs 88 are provided along the edges of the first end 80. In this arrangement, the first end 80 is provided with two extensions 134 each terminating in a down-turned flange 136.

Either of the spring clips 132 or 138 may be employed in the trench assembly 20' of FIGURE 15. For example, in the right hand portion of FIGURE 15, the spring clip 132 is shown connected to the cover plate 32 by the retaining means 74 of FIGURE 4. The spring clip 132 is secured to the cover plate 32 in a predetermined position relative to the cover plate edge 130, whereby the flange 136 is received in the vertical groove 112 of the side rail 30'. The function of the flange 136 is identical to the function of the flange 110. It should be evident that the spring clip 138 may be used in place of the spring clip 132.

Through the use of the tongue-and-groove connections, the temporary holddown screws may be entirely eliminated. As will be appreciated, the spring clip 72, 132 or 138 serves to connect the cover plate 32 to side rails 30' while the tongue-and-groove connection ties the side rails 30' to the cover plate 32 and maintains them in a substantially parallel, spaced-apart relation.

It will also be appreciated that by eliminating the temporary holddown screws, the clearance openings in the cover plate 32 and the threaded openings in the side rails 30' are also eliminated.

It will likewise be appreciated that the arrangement of the leveling screws 124 is such that the access openings 66 (FIGURE 2) heretofore required, are no longer needed.

We claim.

1. In an underfloor electrical cable trench adapted to be embedded in concrete, including spaced-apart side rails having opposed surfaces, and a cover plate spanning the distance between and supported by said side rails, the improvement in means for detachably connecting said cover plate to said side rails, comprising:

spring members having first ends engaging said cover plate and second ends resiliently engaging said opposed surfaces of said side rails, said second ends having diverging camming surfaces positioned between said side rails for camming engagement with said opposed surfaces; and strap members secured to said cover plate and overlapping portions of said first ends for retaining said first end engaged with said cover plate.

2. The improvement defined in claim 1 including tongue and groove means for detachably connecting each of said side rails to said cover plate to maintain said side rails in a predetermined spaced-apart relation.

3. The improvement defined in claim 1 including catch means preventing inadvertent disengagement of said spring members from said strap members.

4. The improvement defined in claim 1 wherein said strap members have strap portions secured directly to said cover plate.

5. The improvement defined in claim 4 wherein said strap portions are welded directly to said cover plate.

6. The improvement defined in claim 1 wherein each of said strap members include strap portions secured directly to the undersurface of said cover plate and a convex indentation between adjacent strap portions, said convex indentation cooperating with the undersurface of the said cover plate to form a passageway captively receiving a said first end.

7. The improvement defined is claim 5 wherein said spring clips are formed from spring steel and said strap members are formed from carbon steel.

8. The improvement defined in claim 1 including generally vertical flanges depending from said cover plate, and generally vertical grooves formed in each of said side rails, said flanges being engaged with said grooves to maintain said side rails in a predetermined spaced-apart relation.

9. The improvement defined in claim 8 wherein said flanges are carried by said retaining means.

10. The improvement defined in claim 8 wherein said flanges are carried by said spring elements.

11. The improvement defined in claim 8 wherein said side rails have shoulders disposed beneath and supporting the opposite edges of said cover plate, said grooves being provided in said shoulders.

References Cited

UNITED STATES PATENTS

| 1,662,422 | 3/1928 | Hodges | 292—256 |
| 2,006,747 | 7/1935 | Ritz-Woller | 220—60 X |
| 3,262,238 | 7/1966 | Fork I | 52—221 |
| 3,286,412 | 11/1966 | Greig | 52—479 X |
| 3,329,763 | 7/1967 | D'Esopo | 174—101 X |
| 3,368,311 | 2/1968 | Fork | 52—221 X |

FOREIGN PATENTS

| 1,357,069 | 2/1964 | France. |
| 1,009,092 | 11/1965 | Great Britain. |

MARVIN A. CHAMPION, Primary Examiner

E. J. McCARTHY, Assistant Examiner

U.S. Cl. X.R.

49—221; 138—92; 220—3.7, 3.8